United States Patent
Denhez

(10) Patent No.: US 9,622,082 B2
(45) Date of Patent: Apr. 11, 2017

(54) MOBILE TERMINAL THEFT DETECTION SYSTEM

(75) Inventor: Alain Denhez, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

(21) Appl. No.: 14/131,494

(22) PCT Filed: Jul. 13, 2012

(86) PCT No.: PCT/EP2012/063806
§ 371 (c)(1),
(2), (4) Date: Apr. 22, 2014

(87) PCT Pub. No.: WO2013/034342
PCT Pub. Date: Mar. 14, 2013

(65) Prior Publication Data
US 2014/0235206 A1      Aug. 21, 2014

(30) Foreign Application Priority Data
Sep. 6, 2011 (FR) ...................................... 11 57863

(51) Int. Cl.
*H04W 12/12* (2009.01)
*H04W 8/22* (2009.01)
*H04W 12/08* (2009.01)

(52) U.S. Cl.
CPC ............. *H04W 12/12* (2013.01); *H04W 8/22* (2013.01); *H04W 12/08* (2013.01)

(58) Field of Classification Search
CPC ..... H04W 88/02; H04W 12/12; H04W 8/205; H04W 12/04; H04W 12/10; H04W 24/04;
(Continued)

(56) References Cited

U.S. PATENT DOCUMENTS 7,570,941 B2    8/2009  Mahajan
2006/0009214 A1  1/2006  Cardina et al.
(Continued)

FOREIGN PATENT DOCUMENTS

CN    1980459     6/2007
CN    101119565   2/2008
(Continued)

*Primary Examiner* — Inder Mehra
(74) *Attorney, Agent, or Firm* — Patti & Malvone Law Group, LLC

(57) ABSTRACT

To detect the theft of a mobile terminal (TM) connected to a radiocommunication network (RR), a device (DA) capable of communicating with a location register (HLR) initially stores an IMSI identity and an IMEI number for the mobile terminal (TM) together with secret data (DonS) provided by the owner of the mobile terminal. After authentication of the mobile terminal by a network entity, the device retrieves the IMSI identity and IMEI number for the mobile terminal, compares the retrieved IMSI identity and IMEI number with the initially stored IMSI identity and IMEI number, queries the mobile terminal (TM) by asking the user of the mobile terminal to provide the secret data if either the retrieved IMSI identity or IMEI number are different from the initially stored IMSI identity or IMEI number, and detects a theft of the mobile terminal if the secret data provided are different from the initially stored secret data (DonS).

20 Claims, 2 Drawing Sheets

(58) Field of Classification Search
CPC ....... H04W 8/06; H04W 8/183; H04W 8/245;
H04W 12/08; H04W 4/14; H04W 60/00;
H04W 88/18; H04W 8/18; H04W 8/20;
H04W 8/22; H04W 12/06; H04L 9/00;
G06F 21/00; H04M 1/66; H04M 1/72577;
H04M 3/2281; H04M 11/04; H04M
2242/30
USPC ..... 370/328, 477; 455/551, 552.1, 558, 411,
455/410; 340/568.1, 571
See application file for complete search history.

(56) References Cited

U.S. PATENT DOCUMENTS

| | | | |
|---|---|---|---|
| 2007/0076760 A1* | 4/2007 | Wennberg | H04W 8/205 370/477 |
| 2007/0077912 A1 | 4/2007 | Mahajan | |
| 2007/0082705 A1* | 4/2007 | Jain | H04M 1/66 455/558 |
| 2007/0250920 A1* | 10/2007 | Lindsay | G06F 21/31 726/7 |
| 2010/0063960 A1* | 3/2010 | Lehto | H04W 24/04 707/621 |
| 2010/0146274 A1* | 6/2010 | Naslund | H04W 12/10 713/168 |
| 2011/0003581 A1* | 1/2011 | Lee | H04W 12/12 455/410 |
| 2011/0014939 A1* | 1/2011 | Ravishankar | H04W 12/12 455/515 |
| 2011/0122813 A1* | 5/2011 | Choe | H04W 8/245 370/328 |

FOREIGN PATENT DOCUMENTS

| | | |
|---|---|---|
| CN | 101287298 | 10/2008 |
| EP | 1379094 | 1/2004 |
| JP | H11505085 | 5/1999 |
| JP | 2008225790 | 9/2008 |
| KR | 10-0941554 | 2/2010 |
| WO | 01/31840 | 5/2001 |

* cited by examiner

MOBILE TERMINAL THEFT DETECTION SYSTEM

TECHNICAL FIELD

The present invention pertains to a mobile terminal theft detection system.

BACKGROUND

Currently, when a mobile terminal is stolen, the owner of the mobile terminal must declare the theft him- or herself. The network operator then places the mobile terminal on a black list so that the mobile terminal can no longer use the network services.

There is a need to rapidly detect the theft of a mobile terminal, in order to limit the harmful consequences of the theft and dissuade such thefts.

SUMMARY

One goal of the invention is to rapidly and effectively detect the theft of a mobile terminal in order to make it unusable.

To achieve this objective, a method according to the invention to detect the theft of a mobile terminal connected to a radiocommunication network comprises the following steps within a device included within the radiocommunication network:

Initially storing an IMSI identity and an IMEI number related to the mobile terminal together with secret data provided by the owner of the mobile terminal, After authentication of the mobile terminal by a network entity capable of communicating with a location register, retrieving the IMSI identity and the IMEI number for the mobile terminal from this network entity, Comparing the retrieved IMSI identity and the IMEI number with the initially stored IMSI identity and IMEI number, If either the retrieved IMSI identity or IMEI number are different from the initially stored IMSI identity or IMEI number, querying the mobile terminal by asking the user of the mobile terminal to provide the secret data, If the secret data provided are different from the initially stored secret data, detecting a theft of the mobile terminal.

Advantageously, the invention offers an additional functionality to the radiocommunication network making it possible to automatically and rapidly place a stolen mobile terminal on a black list in order to render the mobile terminal unusable and to limit the harmful consequences of the theft, such as an expensive bill due to usage of the mobile terminal by the thief.

In another characteristic of the invention, the device may transmit an alert message to an equipment identity register, indicating that the mobile terminal must be placed on a black list.

In other characteristics of the invention, the IMSI identity and IMEI number for the mobile terminal may be stored together with the secret data for a given period and then deleted upon the expiration of this given period.

In another characteristic of the invention, if the secret data provided match the initially stored secret data, the device may store the secret data together with the retrieved IMSI identity and IMEI number.

The invention also concerns a device capable of communicating with a location register on a radiocommunication network to detect the theft of a mobile terminal connected to a radiocommunication network, comprising:

Means to initially store an IMSI identity and an IMEI number related to the mobile terminal together with secret data provided by the owner of the mobile terminal, Means to retrieve the IMSI identity and the IMEI number for the mobile terminal from a network entity capable of communicating with a location register, after authentication of the mobile terminal by this network entity, Means to compare the retrieved IMSI identity and the IMEI number with the initially stored IMSI identity and IMEI number, Means to query the mobile terminal by asking the user of the mobile terminal to provide the secret data, if either the retrieved IMSI identity or IMEI number are different from the initially stored IMSI identity or IMEI number, Means to detect a theft of the mobile terminal, if the secret data provided are different from the initially stored secret data.

The device may be included in the location register or in an equipment identity register.

The invention also pertains to a computer program capable of being implemented within a device, said program comprising instructions that, whenever the program is executed within said device, carry out the steps according to the inventive method.

BRIEF DESCRIPTION OF THE DRAWINGS

The present invention and the benefits thereof shall be better understood upon examining the description below, which makes reference to the attached figures, in which.

DETAILED DESCRIPTION

Figure 1:
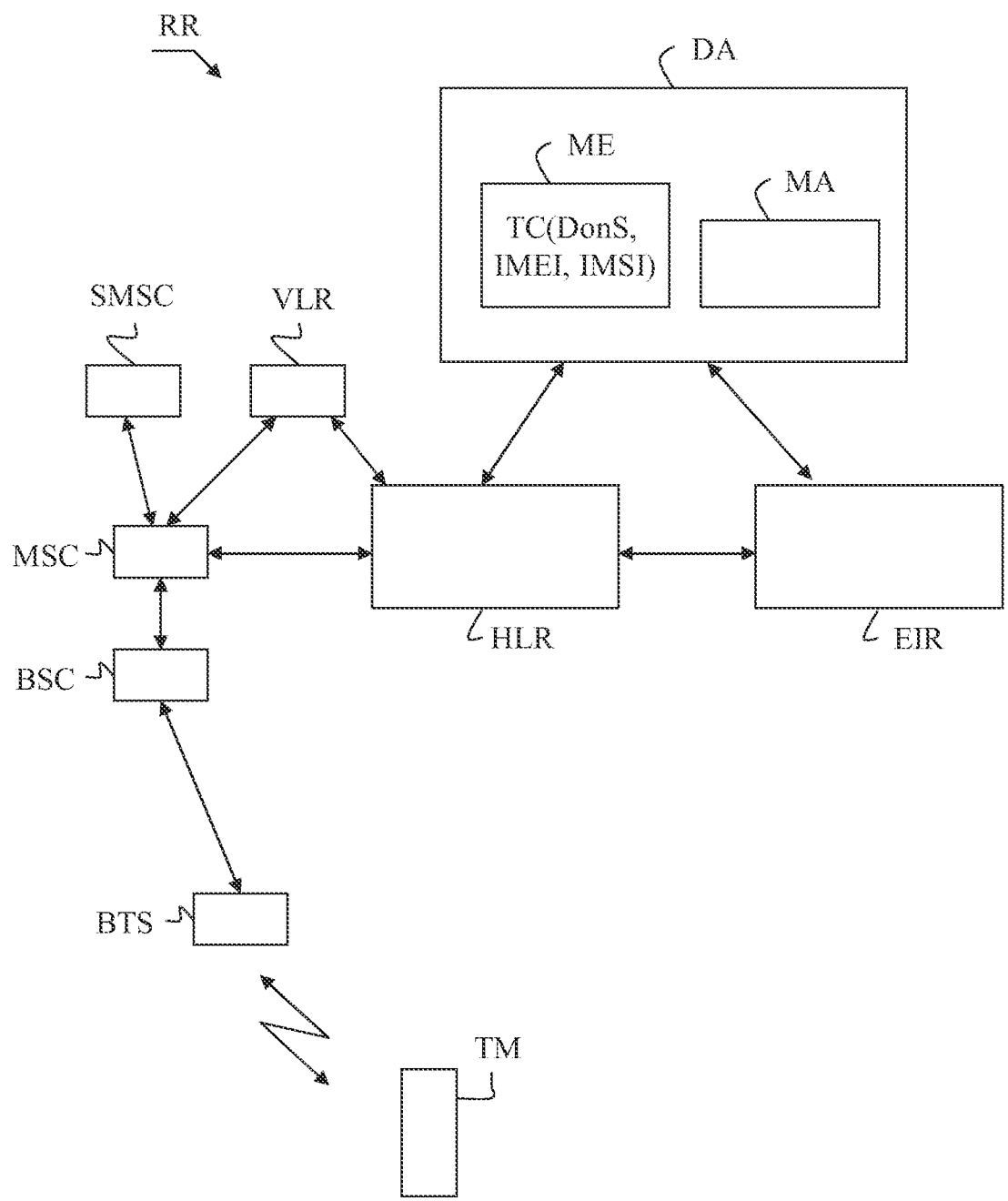
FIG. 1 is a schematic block diagram of a communication system including a detection device for anomalies in relation to a mobile terminal in a radiocommunication network according to the invention.

In reference to FIG. 1, a communication system according to the invention comprises, in particular, a radiocommunication network RR, including an alert device DA and at least one mobile terminal TM.

For example, the radiocommunication network RR is a digital cellular radiocommunication network of the GSM (Global System for Mobile communications) or UMTS (Universal Mobile Telecommunications System), or even CDMA (Code Division Multiple Access) type. The GSM type network may be coupled with a GPRS (General Packet Radio Service) network for the transmission of data by packets with mobility and access management by radio. For example, the radiocommunication network RR is able to authorize a mobile terminal to send and receive data through the network RR when the user of the mobile terminal is identified at the network, for example by means of a subscriber identification module associated with the mobile terminal.

FIG. 1 represents components of the localization area of the GSM type network RR where the communicating equipment is situated. The location area comprises an MSC (Mobile service Switching Center), which is connected by means of a BSC (Base Station Controller) to a base station BTS (Base Transceiver Station) connected by means of a radio link to the mobile terminal TM.

The network RR comprises a nominal location register HLR (Home Location Register) and one or more visitor location registers VLR (Visitor Location Register) connected to the switch MSC. The register HLR manages a database containing, in particular, an international identity IMSI (International Mobile Subscriber Identity) associated with a subscription profile for each user of the network RR and the number of the register VLR to which the mobile terminal TM is temporarily connected. The register VLR is a relay of the register HLR and contains characteristics of the users located in the localization area to manage their mobility.

The register HLR, via an authentication center AUC, authenticates each mobile terminal on the radiocommunication network, for example by means of the SIM ("Subscriber Identity Module") card included in the mobile terminal. In particular, the register HLR generates security data in the form of an authentication vector, and transmits said data to an entity on the network requesting authentication of the mobile terminal.

Authentication of the mobile terminal may be requested by a network entity, such as a VLR register, for example when the mobile terminal is turned on and requests a connection to the network, or every time the location is updated, every time a call is made, or before activating or deactivating certain additional services.

The register HLR is also connected to an equipment identity register EIR managing a database containing the international equipment number IMEI (International Mobile Equipment Identity) thus making it possible to identify mobile terminals. In particular, the register EIR manages a black list containing the IMEI numbers of stolen mobile terminals, rendering the stolen mobile terminal unusable within the network RR as well as within other networks sharing their black lists. In this case, it is assumed that the register EIR communicates with other registers of the same type on other networks.

It is assumed that the register HLR is capable of retrieving the IMEI numbers of authenticated mobile terminals. Optionally, the register HLR stores a list of IMEI numbers for mobile terminals associated respectively with the IMSI identities of the mobile terminals.

According to the invention, the alert device DA is capable of detecting anomalies related to one or more mobile terminals connected to the radiocommunication network, based on data managed by the register HLR. According to one embodiment, the alert device DA is directly or indirectly linked to the register EIR via a packet based communication network. As a variant, the alert device DA is included within the register HLR. As a variant, the alert device DA is included in the register EIR, or else the alert device DA and the register EIR are merged into one and the same unit.

The alert device DA comprises an evaluation module ME and an alert module MA.

The evaluation module ME comprises an interface to store the secret data DonS provided by the user of the mobile terminal TM. The secret data are associated with the IMEI number of the mobile terminal TM in a look-up table TC. The secret data DonS and the IMEI number are also associated with the IMSI identity in the look-up table TC.

When the IMEI/IMSI pair for a user of a mobile terminal changes, the evaluation module ME detects an anomaly and activates the alert module MA.

In a first embodiment, each time the mobile terminal TM is authenticated or when the mobile terminal TM is turned on triggering a procedure to connect to the network RR, the register HLR transmits the IMEI/IMSI pair for the mobile terminal to the device DA. The latter then detects an anomaly if the IMEI/IMSI pair received is not included in the look-up table TC even though the IMEI number is in fact present in the table, which means that the mobile terminal TM has probably been stolen.

In a second embodiment, each time the mobile terminal TM is authenticated or when the mobile terminal TM is turned on triggering a procedure to connect to the network RR, the register HLR itself checks whether or not the IMEI/IMSI pair for a mobile terminal has changed, which is to say whether or not the IMEI number for the mobile terminal has been associated with a different IMSI identity.

The alert module MA queries the mobile terminal TM by asking the user of the mobile terminal TM to provide the secret data DonS that were initially stored with the IMEI IMSI pair.

In one embodiment, the alert device DA may transmit data messages to the mobile terminal TM through a short message server SMSC (Short Message Service Center). The server SMSC comprises an access gateway to communicate with the alert device DA over a packet-based network, and another access gateway to communicate with at least the mobile service switch MSC through a packet-based network. The packets transmitted by the alert device DA are formatted in the server SMSC into short messages SMS and/or multimedia messages MMS (Multimedia Messaging Service) transmitted to the mobile terminal TM. In this case, the user provides the secret data in text form through a text message.

According to another embodiment, the alert device DA comprises a voice server functionality establishing a call with the mobile terminal TM. In this case, the user provides the secret data orally to the voice server.

If the user provides the correct secret data, the alert module MA stores the secret data DonS together with the new IMEI/IMSI pair. If the user does not provide the correct secret data, the alert module MA sends an alert message to the register EIR indicating that the mobile terminal TM must be placed on a black list.

Figure 2:
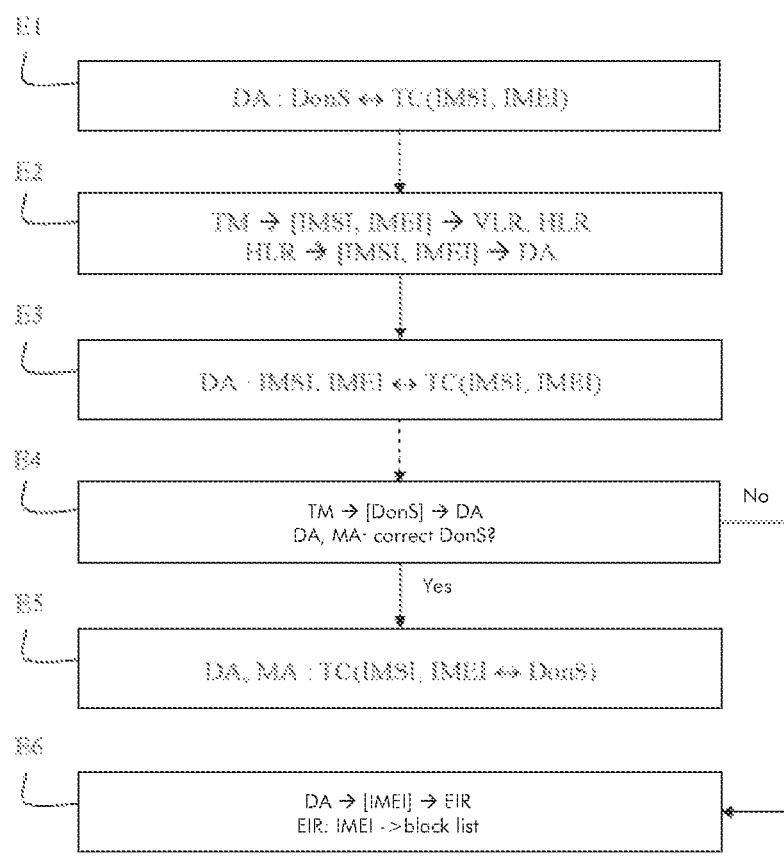
FIG. 2 is an algorithm of a detection method for anomalies in relation to a mobile terminal in a radiocommunication network according to the invention.

In reference to FIG. 2, a method for detecting the theft of a mobile terminal according to the invention comprises steps E1 to E6 automatically executed in the communication system according to the invention.

In step E1, following a subscription by the user who owns the mobile terminal TM with the operator of the radiocommunication network RR, a user profile is created in the register HLR. The user provides secret data DonS that are stored together with the IMEI number of the mobile terminal and the IMSI identity in a look-up table TC.

The secret data DonS are for example a password, a code, or a special sequence of alphanumeric characters.

In Step E2, a network entity such as the register VLR for the location area of the mobile terminal or the register HLR requests authentication of the SIM card included in the mobile terminal subsequent to the triggering of a procedure concerning the mobile terminal and requiring its authentication, for example when the mobile terminal TM is turned on.

The register HLR retrieves the IMSI identity of the SIM Card in the mobile terminal and the IMEI number of the mobile terminal. The register HLR transmits the IMEI/IMSI pair for the mobile terminal to the device DA.

In step E3, the evaluation module of the alert device DA compares the IMEI/IMSI pair received with the IMEI/IMSI pairs in the look-up table TC.

If the IMEI/IMSI pair received is not in the look-up table TC but the IMEI number is present in the table, the evaluation module ME detects an anomaly.

As a variant, in step E3, the register HLR itself checks whether or not the IMEI/IMSI pair for a mobile terminal has changed. If the register HLR detects a change, it transmits the IMEI number or the alert device DA.

In step E4, the alert module MA queries the mobile terminal TM by asking the user of the mobile terminal TM to provide the secret data DonS that were initially stored with the IMEI/IMSI pair matching the IMEI number received from the register HLR.

To that end, the alert device DA may communicate with the mobile terminal TM for example by short message or through the intermediary of a voice server.

The alert module MA compares the secret data provided by the user of the mobile terminal TM with the secret data DonS initially stored in step E1.

In step E5, if the user provides the correct secret data, the alert module MA stores the secret data DonS together with the new IMEI/IMSI pair. Optionally, the IMEI/IMSI pair initially stored in step E1 is stored for a limited duration and then deleted after the expiration of this period to release memory and update the look-up table.

In step E6, if the user does not provide the correct secret data, the alert module MA detects that the mobile terminal has been stolen and sends an alert message to the register EIR indicating that the mobile terminal TM must be placed on a black list. In particular, the IMEI number of the mobile terminal TM retrieved by the register HLR when authenticating the mobile terminal TM is placed on a black list.

Optionally, the user may have several attempts to provide the correct secret data DonS. For example, the IMEI number of the mobile terminal TM is placed on a black list if the user has not provided the correct secret data after three attempts.

The invention described here relates to a method and device to detect the theft of a mobile terminal. According to one embodiment of the invention, the steps of the inventive method are determined by the instructions of a computer program incorporated into a device, such as the device DA. The program comprises program instructions, which when said program is loaded and executed within the device, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method to detect the theft of a mobile terminal connected to a radiocommunication network, the method performed by a device operatively coupled to the network and comprising the steps of:
   initially storing an IMSI identity and an IMEI number related to the mobile terminal in a database managed by a location register operatively coupled to the network, and initially storing a secret data associated with an owner of the mobile terminal to create a stored IMSI identity, a stored IMEI number and a stored secret data;
   after authentication of the mobile terminal, obtaining a retrieved IMSI identity and a retrieved IMEI number retrieved from the mobile terminal during authentication;
   comparing the retrieved IMSI identity and the retrieved IMEI number with the stored IMSI identity and the stored IMEI number;
   if either the retrieved IMSI identity or the retrieved IMEI number are different from the stored IMSI identity or the stored IMEI number, obtaining entered secret data by sending a query to the mobile terminal requesting entry of secret data;
   if the entered secret data is different from the stored secret data, detecting a theft of the mobile terminal.

2. The method of claim 1, further comprising the step of:
   after detecting a theft, communicating an alert message indicating that the mobile terminal should be placed on a list.

3. The method of claim 1 further comprising the step of:
   if the entered secret data and stored secret data match, the retrieved IMSI identity and the retrieved IMEI number are stored in association with the stored secret data or entered secret data.

4. The method of the claim 1, wherein the entered secret data is entered through a text message.

5. The method of the claim 1, wherein the entered secret data is entered verbally.

6. The method of claim 1, wherein the stored IMSI identity, the stored IMEI number and the stored secret data are stored for a given period and then deleted upon expiration of the given period.

7. The method of claim 6 further comprising the step of:
   if the entered secret data and stored secret data match, the retrieved IMSI identity and the retrieved IMEI number are stored in association with the stored secret data or entered secret data.

8. The method of the claim 7, wherein the entered secret data is entered through a text message.

9. The method of the claim 7, wherein the entered secret data is entered verbally.

10. An apparatus, operatively coupled to a radiocommunication network, to detect the theft of a mobile terminal connected to the radiocommunication network, said apparatus further comprising:
    storage means for initially storing an IMSI identity and an IMEI number related to the mobile terminal in a database managed by a location register operatively coupled to the network, and for initially storing a secret data associated with an owner of the mobile terminal to create a stored IMSI identity, a stored IMEI number and a stored secret data;
    means to obtain a retrieved IMSI identity and a retrieved IMEI number from a network entity capable of communicating with the location register, after authentication of the mobile terminal said retrieved IMSI identity and retrieved IMEI number received from the mobile terminal during authentication;
    means to compare the retrieved IMSI identity and the retrieved IMEI number with the stored IMSI identity and the stored IMEI number;
    means to query the mobile terminal to obtain entered secret data by requesting entry of secret data, if either the retrieved IMSI identity or the retrieved IMEI number are different from the stored IMSI identity or the stored IMEI number;
    means to communicate an alert message, if the entered secret data is different from the stored secret data.

11. The apparatus of claim 10 being included in the location register.

12. The apparatus of claim 10 being included in an equipment identity register.

13. A non-transitory computer-readable storage device storing computer-executable instructions which, when executed by a processor of a computing device, causes the processor perform a method of detecting the theft of a mobile terminal connected to a radiocommunication network when the program is run on a programmable device operatively coupled to the network, the method comprising the steps of:

initially storing an IMSI identity and an IMEI number related to the mobile terminal in a database managed by a location register operatively coupled to the network, and initially storing a secret data associated with an owner of the mobile terminal to create a stored IMSI identity, a stored IMEI number and a stored secret data;

after authentication of the mobile terminal, obtaining a retrieved IMSI identity and a retrieved IMEI number retrieved from the mobile terminal during authentication;

comparing the retrieved IMSI identity and the retrieved IMEI number with the stored IMSI identity and the stored IMEI number;

if either the retrieved IMSI identity or the retrieved IMEI number are different from the stored IMSI identity or the stored IMEI number, obtaining entered secret data by sending a query to the mobile terminal requesting entry of secret data;

if the entered secret data is different from the stored secret data, detecting a theft of the mobile terminal.

14. The non-transitory computer-readable storage device of claim 13 further comprising the step of:

if the entered secret data and stored secret data match, the retrieved IMSI identity and the retrieved IMEI number are stored in association with the stored secret data or entered secret data.

15. The non-transitory computer-readable storage device of the claim 13, wherein the entered secret data is entered through a text message.

16. The non-transitory computer-readable storage device of the claim 13, wherein the entered secret data is entered verbally.

17. The non-transitory computer-readable storage device of claim 13, wherein the stored IMSI identity, the stored IMEI number and the stored secret data are stored for a given period and then deleted upon expiration of the given period.

18. The non-transitory computer-readable storage device of claim 17 further comprising the step of:

if the entered secret data and stored secret data match, the retrieved IMSI identity and the retrieved IMEI number are stored in association with the stored secret data or entered secret data.

19. The non-transitory computer-readable storage device of the claim 18, wherein the entered secret data is entered through a text message.

20. The non-transitory computer-readable storage device of the claim 18, wherein the entered secret data is entered verbally.

\* \* \* \* \*